United States Patent
Duncan et al.

(10) Patent No.: US 9,442,759 B2
(45) Date of Patent: Sep. 13, 2016

(54) CONCURRENT EXECUTION OF INDEPENDENT STREAMS IN MULTI-CHANNEL TIME SLICE GROUPS

(75) Inventors: Samuel H. Duncan, Arlington, MA (US); Lacky V. Shah, Los Altos Hills, CA (US); Sean J. Treichler, Sunnyvale, CA (US); Daniel Elliot Wexler, Soda Springs, CA (US); Jerome F. Duluk, Jr., Palo Alto, CA (US); Philip Browning Johnson, Campbell, CA (US); Jonathon Stuart Ramsay Evans, Santa Clara, CA (US)

(73) Assignee: NVIDIA Corporation, Santa Clara, CA (US)

(*) Notice: Subject to any disclaimer, the term of this patent is extended or adjusted under 35 U.S.C. 154(b) by 878 days.

(21) Appl. No.: 13/316,334

(22) Filed: Dec. 9, 2011

(65) Prior Publication Data
US 2013/0152093 A1 Jun. 13, 2013

(51) Int. Cl.
G06F 9/46 (2006.01)
G06F 13/00 (2006.01)
G06F 9/48 (2006.01)
G06F 9/38 (2006.01)

(52) U.S. Cl.
CPC ......... *G06F 9/4881* (2013.01); *G06F 9/3851* (2013.01); *G06F 9/461* (2013.01)

(58) Field of Classification Search
None
See application file for complete search history.

(56) References Cited

U.S. PATENT DOCUMENTS

| | | | | |
|---|---|---|---|---|
| 8,020,169 B2* | 9/2011 | Yamasaki | | 718/108 |
| 8,589,943 B2* | 11/2013 | Bates | | G06F 9/461 |
| | | | | 718/100 |
| 2011/0072211 A1* | 3/2011 | Duluk et al. | | 711/118 |

OTHER PUBLICATIONS

Lindholm et al., NVIDIA Tesla: A Unified Graphics and Computing Architecture; IEEE, 2008.*
Tarjan, Efficient Throughput Cores for Asymmetric Manycore Processors; University of Virginia, Aug. 2009.*
Ryoo et al., Optimization Principles and Application Performance Evaluation of a Multithreaded GPU using CUDA, ACM 2008.*

\* cited by examiner

*Primary Examiner* — Bing Zhao
(74) *Attorney, Agent, or Firm* — Artegis Law Group, LLP (57) ABSTRACT

A time slice group (TSG) is a grouping of different streams of work (referred to herein as "channels") that share the same context information. The set of channels belonging to a TSG are processed in a pre-determined order. However, when a channel stalls while processing, the next channel with independent work can be switched to fully load the parallel processing unit. Importantly, because each channel in the TSG shares the same context information, a context switch operation is not needed when the processing of a particular channel in the TSG stops and the processing of a next channel in the TSG begins. Therefore, multiple independent streams of work are allowed to run concurrently within a single context increasing utilization of parallel processing units.

23 Claims, 9 Drawing Sheets

CONCURRENT EXECUTION OF INDEPENDENT STREAMS IN MULTI-CHANNEL TIME SLICE GROUPS

BACKGROUND OF THE INVENTION

1. Field of the Invention

The present invention generally relates to task execution and, more specifically, to multi-channel time slice groups.

2. Description of the Related Art

A graphics processing unit (GPU) includes a large array of streaming multiprocessors (SMs) that are configured to execute work generated by different applications within the system. Work generated by applications for execution within the GPU may belong to several classes including graphics work, compute work, ray tracing work etc. Each of these classes of work has different characteristics.

Compute work is typically organized such that different groupings of tasks within the compute work can execute concurrently. However, the host unit in the GPU, launches the compute work task sequentially. Therefore, if a particular task is waiting for a previous task to complete and the previous task uses only a fraction of the SMs, then the unused SMs are idle. Such a scenario is highly undesirable as the processing power of the SMs is wasted while the SMs remain idle and compute work that can be processed more efficiently takes longer to process.

As is known in the art, a solution to the above problem is to include each group of tasks in a different channel, such that, when one channel is stalled, tasks specified by a different channel can begin executing. However, in such an implementation, the SMs must idle and a context switching operation is needed each time a channel is switched. As is well-known to those skilled in the art, unnecessarily idling a parallel machine is inefficient and context switching operations are both time and processing intensive. Therefore, requiring a context switch operation every time a channel is switched causes unnecessary performance degradation on the system.

Accordingly, what is needed in the art is a system and method for allowing multiple independent streams of work to run concurrently within a single context.

SUMMARY OF THE INVENTION

One embodiment of the invention is a method for scheduling tasks for execution within a processing unit. The method includes determining that a set of channels that specify tasks to be executed within the processing unit are associated with a time slice group, wherein each channel specifies a different set of tasks, and context information corresponding to every channel associated with the time slice group is the same, selecting a first channel included in the set of channels for execution within the processing unit next, determining whether context information corresponding to the first channel needs to be set within the processing unit, wherein, when a previous channel executed by the processing unit is included in the set of channels, context information corresponding to the first channel does not need to be set within the processing unit, and, when the previous channel executed by the processing unit is not included in the set of channels, context information corresponding to the first channel does need to be set within the processing unit, and scheduling a first set of tasks specified by the first channel for execution within the processing unit.

One advantage of the present invention is that different channels of work that share the same context information can be executed by the GPCs 208 without the need of intervening context switching operations. Consequently, if a channel is stalled, a different channel can be scheduled for execution without incurring a context switching cost, thereby increasing the overall throughput and performance of the system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
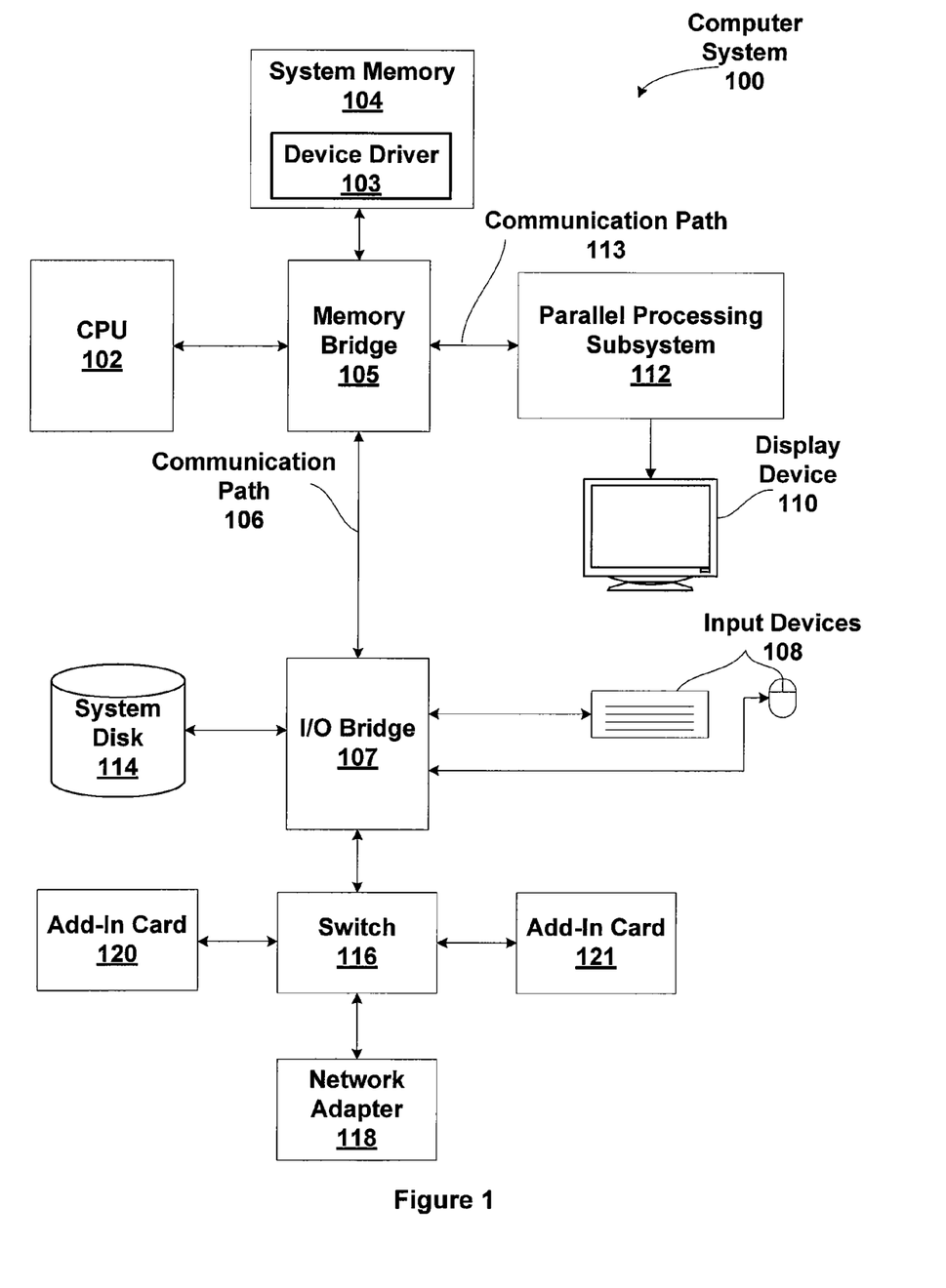
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. Communication paths interconnecting the various components in FIG. 1 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
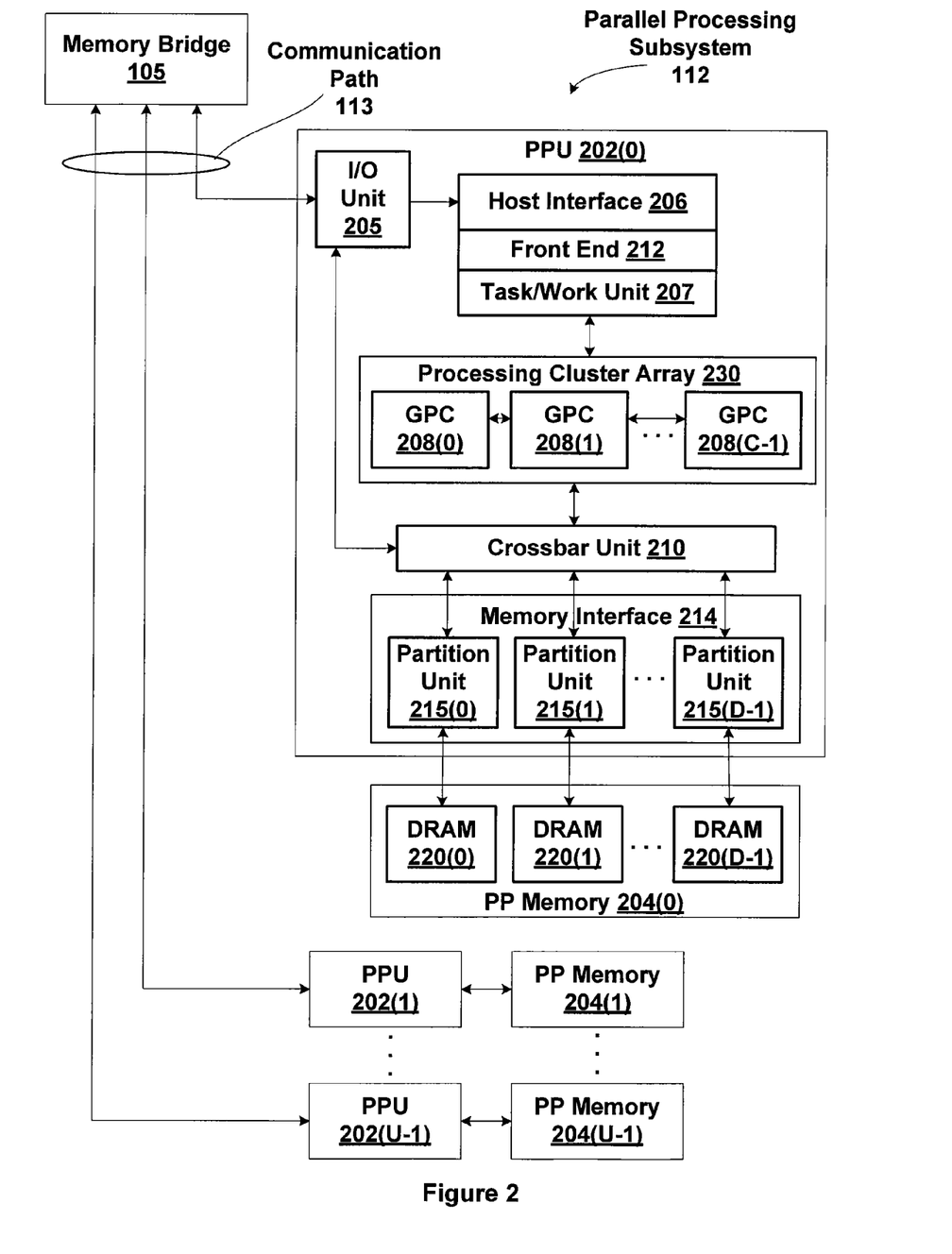
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

Referring back now to FIG. 2 as well as FIG. 1, In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer to control scheduling of the different pushbuffers.

Each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
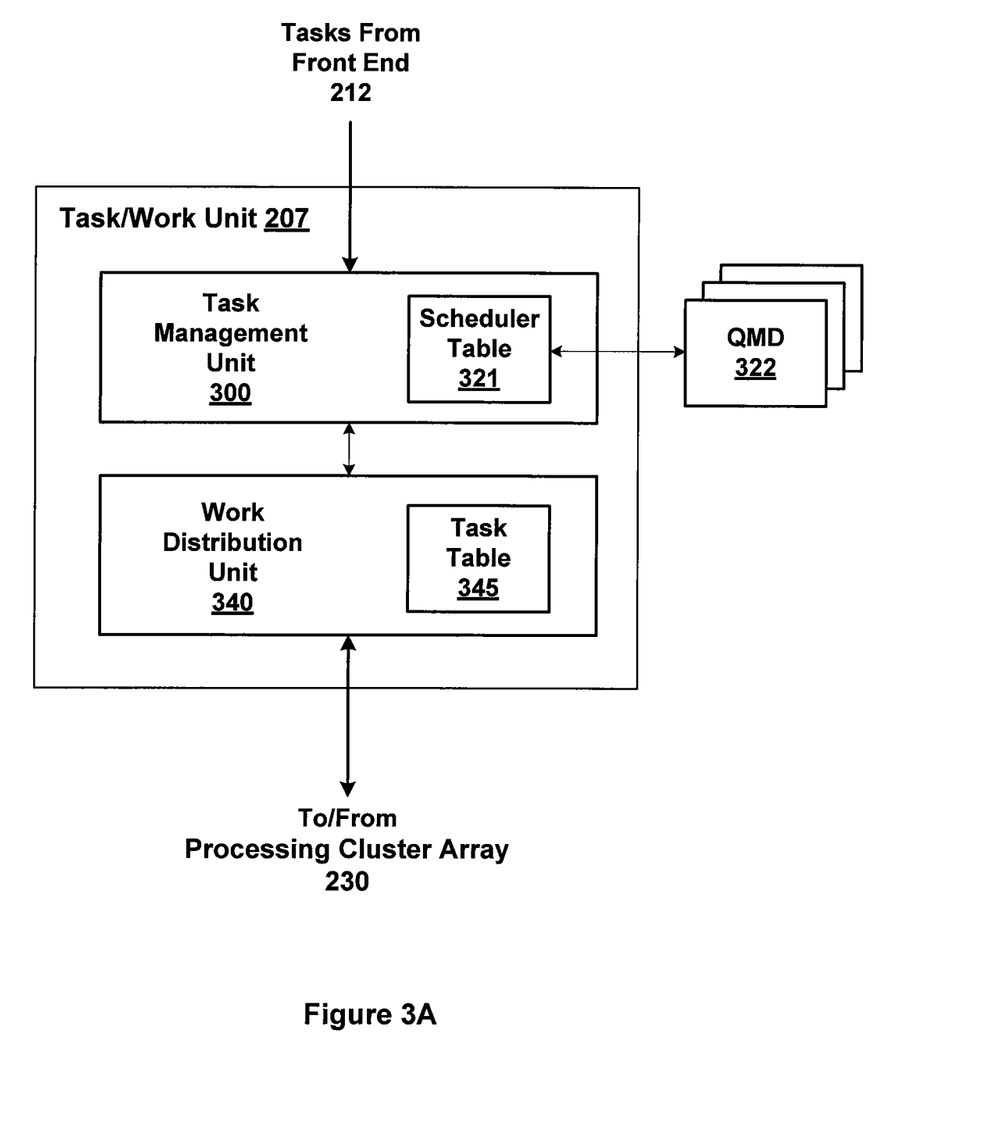
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a linked list of pointers to the TMDs 322 corresponding to the tasks in the scheduler table 321. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution, enabling the task management unit 300 to schedule tasks based on priority information or using other techniques.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution the task is not complete, the task is added to a linked list in the scheduler table 321. When a child processing task is generated, the child task is added to a linked list in the scheduler table 321. A task is removed from a slot when the task is evicted.

Task Processing Overview

Figure 3B:
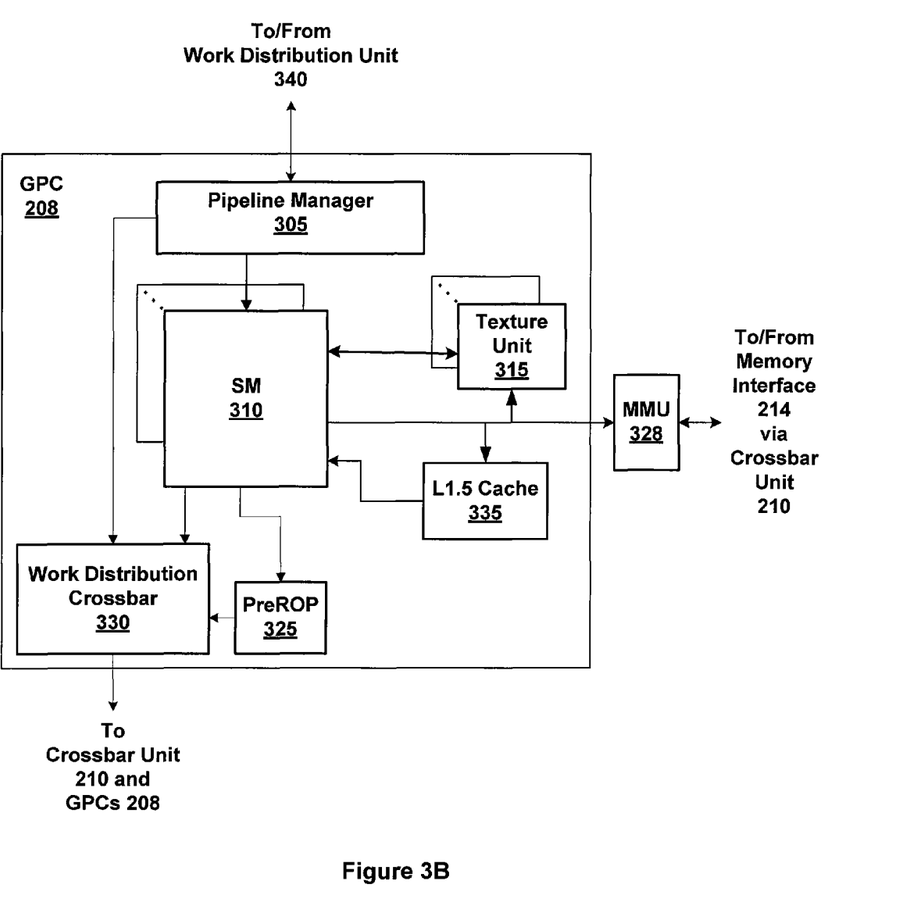
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*W thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
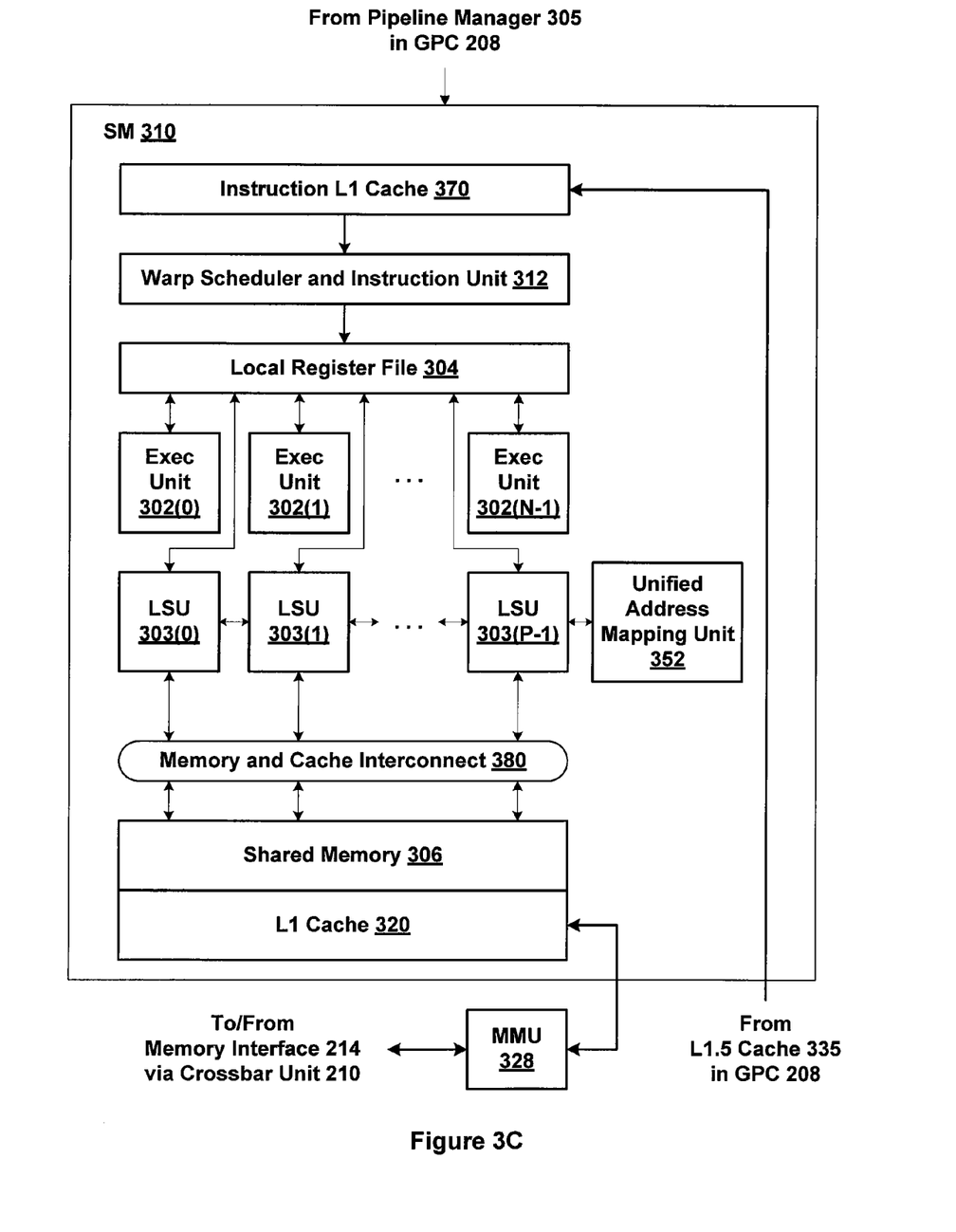
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads in the same grid or queue (or by all LSUs 303) that store a CTA identifier, the CTA dimensions, the dimensions of a grid to which the CTA belongs (or queue position if a queue), and an identifier of the grid or queue to which the CTA belongs. CTAs that belong to a grid have implicit x,y,z parameters indicating the position of the respective CTA within the grid. Special registers are written during initialization in response to commands received via front end 212 from device driver 103 and do not change during execution of a processing task. The front end 212 schedules each processing task for execution as either a grid or queue. Each CTA is associated with a specific grid or queue for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Multi-Channel Time Slice Groups

A time slice group (TSG) is a grouping of different streams of work (referred to herein as "channels") that share the same context information. In one embodiment the set of channels belonging to a TSG are processed in a round-robin order. Importantly, because each channel in the TSG shares the same context information, a context switch operation is not needed when the processing of a particular channel in the TSG stops and the processing of a next channel in the TSG begins. Therefore, in a particular processing cycle, a context switch operation that sets the relevant context information needed to process the channels in a TSG is performed only once when the first channel is selected for processing.

Figure 4:
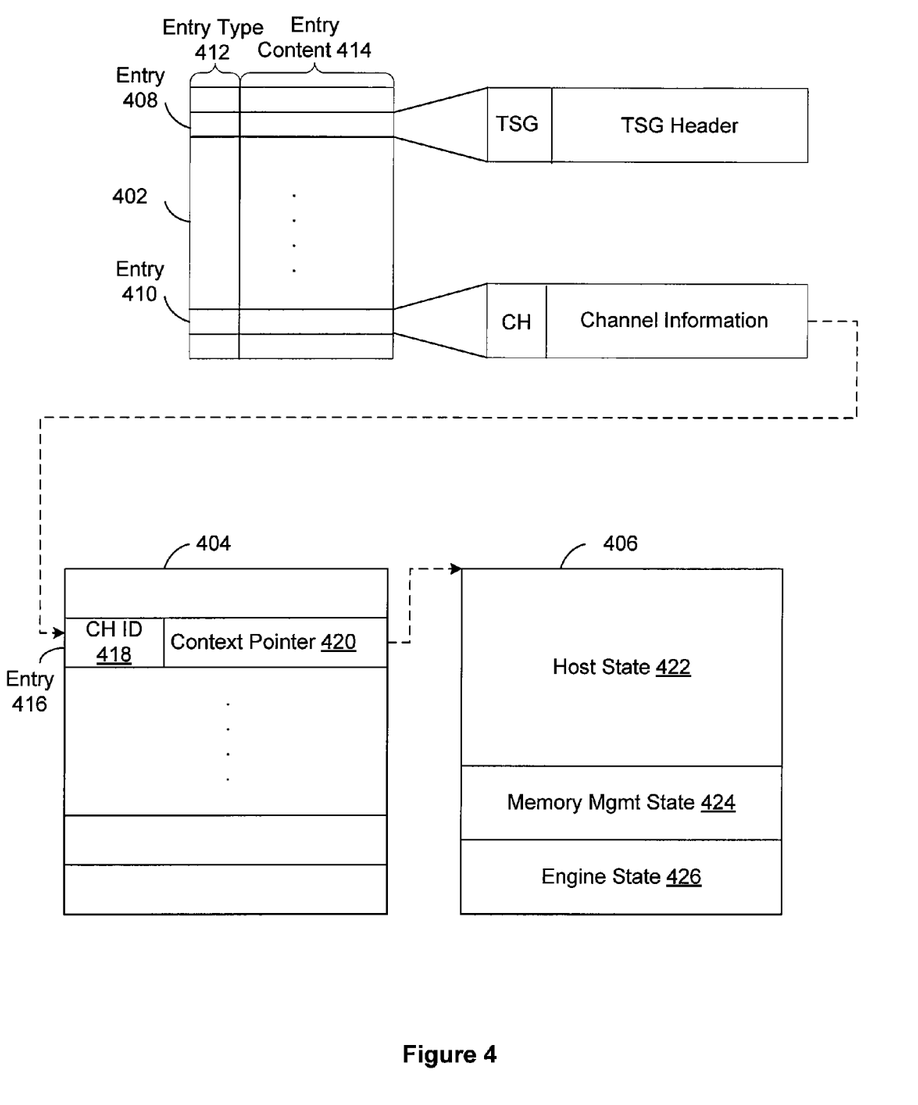
FIG. 4 is an illustration of a run list, a channel map and a per-channel context information based on which tasks are scheduled for processing within the GPCs, according to one embodiment of the present invention.

FIG. 4 is an illustration of a run list 402, a channel map 404 and a per-channel context information 406 based on which tasks are scheduled for processing within the GPCs 208, according to one embodiment of the present invention.

As previously described herein, applications generate tasks for execution within the PPU 202, where each task is associated with a particular channel. A channel may be associated with compute tasks or graphics tasks. Any other types of tasks or combinations thereof, are within the scope of this invention. The processing sequence of the channels is defined by the applications. The driver 103, upon receiving the channels from the applications, groups channels that share the same context information into a single time slice group (TSG). In one embodiment, the number of channels that can belong to a particular TSG is limited to a pre-determined number.

Based on the channels and the corresponding TSGs, a resource manager (not shown) within the driver 103 then generates the run list 402. The run list 402 includes a set of run list entries that each includes an entry type 504 and entry content 506. There are two types of run list entries, a channel run list entry, such as run list entry 410, or a TSG run list entry, such as run list entry 408. A channel run list entry has a channel entry type 412 and, in the entry content 414, stores a channel identifier associated with a particular channel. A TSG entry has a TSG entry type 412 and, in the entry content 414, stores a TSG header. The TSG header specifies a TSG identifier (ID), the length of the TSG in run list entries that indicates the number of channels belonging to the TSG and a run list time slice that indicates an amount of time that channels belonging to the TSG can be executed within a single processing cycle.

The run list 402 is organized such that channel run list entries associated with the channels belonging to a particular TSG are included directly after the TSG run list entry associated with the particular TSG. For example, if the TSG header of the run list entry 408 indicates that the TSG associated with the run list entry 408 has two channels, then the two entries directly following the run list entry 408 are channel run list entries associated with those two channels. The channels belonging to the particular TSG are scheduled for execution in a pre-defined order. The order may be specified based on the sequence of the run list entries within the run list 406 or any other ordering mechanism. It will be recognized by those familiar in the art that a run list is only an example of how channels can be grouped together that can share a context image, any mechanism that groups channels that can share a context image is covered by this patent. In one embodiment, each channel entry associated with a channel belonging to a TSG includes a portion that indicates whether that channel is the "next" channel in the TSG. This "next" portion guarantees that the TSG starts processing on the same channel the TSG was last processing.

The channel map 404 is a mapping between channels and corresponding context information. The channel map 404 includes a set of map entries, where each map entry is associated with a different channel and includes a channel identifier and a pointer to context information associated with the channel. Each channel run list entry included in a run list 402 is associated with a map entry within the channel map 404. Therefore, a channel ID stored in the entry content 414 of a channel run list entry included in the run list 402 corresponds to a channel ID stored in a map entry included in the channel map 404. Further, each map entry in the channel map 404 includes a pointer to context information corresponding to the channel associated with the map entry. For example, map entry 416 is associated with a particular channel that is identified by the channel ID 418 and that is also associated with the channel run list entry 410. The map entry 416 includes a context pointer 420 that points to per-channel context information 406 associated with the particular channel. The per-channel context information 406 includes, but is not limited to, host state, memory management state, engine state, etc. needed to execute tasks included in the particular channel.

Figure 5:
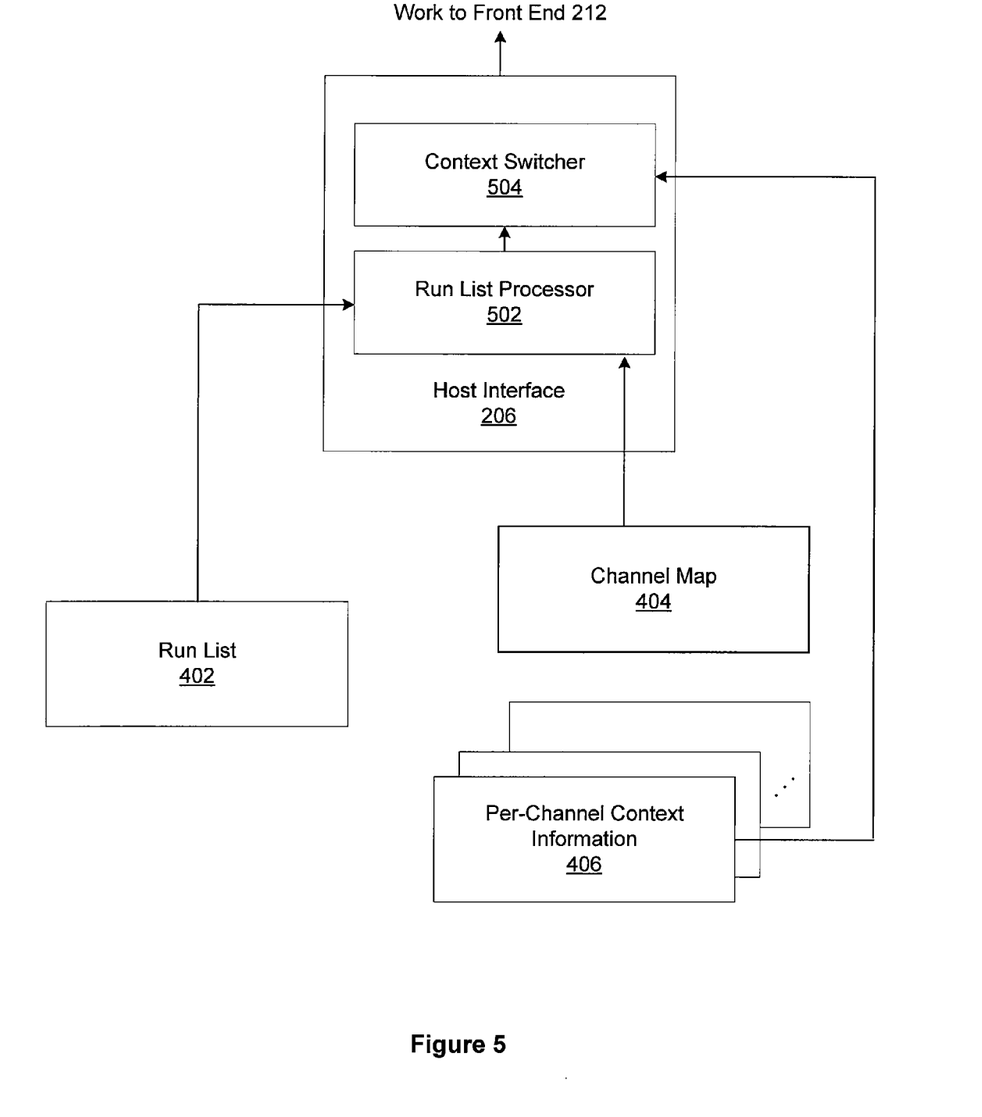
FIG. 5 is a more detailed illustration of the host interface of FIG. 2 configured to select work for execution within the processing cluster array, according to one embodiment of the present invention.

FIG. 5 is a more detailed illustration of the host interface 206 of FIG. 2 configured to select work for execution within the processing cluster array 230, according to one embodiment of the present invention. As shown, the host interface 206 includes a run list processor 502 and a context switcher 504. In addition, the host interface 206 has access to the run list 402, the channel map 404 and per-channel context information 406.

When new work needs to be scheduled for execution within the GPCs 208, the run list processor 502 analyses the run list 402 to select a channel to be scheduled for execution next. Typically, before the tasks associated with a particular channel can be processed, per-channel context information 408 associated with that channel must be set within the GPCs 208. Thus, once the channel to be scheduled next is selected, the run list processor 502 determines whether a context switch is needed for executing tasks associated with the selected channel. If a context switch is needed, then the context switcher 404 issues a context switch operation to be performed based on the per-channel context information 408 associated with the selected channel. If, however, a context switch is not needed, then a context switch operation is not needed and tasks associated with the selected channel are scheduled for execution. Importantly, because channels that belong to the same TSG are associated with the same per-channel context information, those channels can be scheduled for execution subsequent to one another without the need of a context switching operation in between.

In operation, the run list processor 502 traverses through the entries within the run list 402 in a round robin fashion. When determining which channel should be scheduled for execution next, the run list processor 502 retrieves the next entry in the run list 402. If the next entry in the run list 402 is a TSG run list entry, then the run list processor 502 reads the TSG header included in the entry content 414. Based on the length specified in the TSG header, the run list processor 502 identifies the channel run list entries belonging to the TSG. Based on the TSG header, the run list processor 502 also determines the time slice that is allocated to the TSG such that, the channels in the TSG are processed in round robin order until the time slice expires, the TSG runs out of tasks it can launch, or preempted from the system. The run list processor 502 then identifies a particular channel associated with a channel run list entry corresponding to the TSG that should be scheduled for execution next. In one embodiment, the first channel loaded in a TSG is identified based on the presence of a bit in the entry content 414 of the channel run list entry that indicates that the particular channel in the TSG should be scheduled for execution next.

Once the particular channel is identified, the run list processor 502 indicates to the context switcher 504 to load the context information related to the particular channel. The context switcher 504, based on the channel map 404, identifies the per-channel context information 406 associated with the particular channel and switches the context in the GPCs 208 accordingly. Once the context information associated with the particular channel is loaded, the time slice allocated to the TSG starts and tasks associated with the particular channel can begin to be executed by the GPCs 208.

Tasks associated with the particular channel within the TSG continue to execute until (i) a channel switch to a different channel within the TSG is needed or (ii) a channel switch to a channel outside the TSG is needed. A channel switch from the particular channel to a different channel within the TSG is needed when the execution of tasks within the particular channel is completed or when the execution is stalled as a result of a semaphore acquire failure. In such a scenario, a next channel within the TSG is selected for execution. Because all channels within the TSG share the same context information, when switching between channels within the same TSG, a context switch operation is not needed. Therefore, tasks associated with the newly selected channel can be executed on the GPCs 208 without an intervening context switching operation. Importantly, because the TSG can switch from one channel to another when tasks are complete or when a semaphore acquire fails, the tasks between channels are not ordered unless done so explicitly by a semaphore.

In one embodiment, channels within a TSG may have access to multiple different types of processing cluster types. E.g. compute cluster, Graphics cluster, Copy cluster, 2d cluster, etc. In the preferred embodiment each cluster is capable of working on an independent channel simultaneously. However, in other embodiments some clusters may be mutually exclusive. E.g. The compute cluster may need to wait until graphics cluster idles before executing a task. In other embodiments, a cluster may only be able to process a single task at a time. E.g. the copy cluster may only handle a single copy. In some embodiments a channel may only have access to a single processing cluster at a time. In some embodiments independent clusters need to have their contexts independently loaded before processing the first TSG task.

Further, while channels belonging to the TSG are scheduled for execution within the GPCs 208, a copy engine (not shown) performs copy operations concurrently with the task execution and based on the currently set context information For the asynchronous copy engines, this amounts to a performance enhancement because the copy engine does not need to context switch independently.

A channel switch to a channel outside the TSG is needed if one of several conditions is met. These conditions include, but are not limited to, (i) the expiration of the time slice allocated to the TSG, (ii) each channel within the TSG being completely executed and, therefore, idle, (iii) each channel within the TSG being stalled because of a semaphore acquire failure or being idle, (iv) a yield method being encountered that effectively expires the time slice allocated to the TSG, and (vi) a pre-emption condition that forces the selection of a new channel or of a different run list. If a condition that requires a channel switch to a channel outside the TSG exists, then the run list processor 502 first saves the current state of the TSG, including the identity of the last channel within the TSG that was at least partially processed. The run list processor 502 then selects the next channel outside of the TSG to be processed. Because the context information related to a channel outside of the TSG is different, a context switch operation is needed when switching to a channel outside of the TSG.

Those skilled in the art will recognize that other criterion for switching between channels in a TSG or out of TSG can be used as long as the criterion allow software to specific contiguous tasks in a channel that will execute as an atomic operation. In other words, a channel need a way to guarantee that a task that sets up state and a second task that executes on that state are run in sequence without switching to another channel in the TSG.

In one embodiment, each channel within the TSG has a work pending bit that indicates whether any work related to the channel is outstanding. In such an embodiment, if work related to the channel is still pending when a channel switch occurs, then the work pending bit is set to indicate that work related to the channel is still outstanding.

Figure 6A:
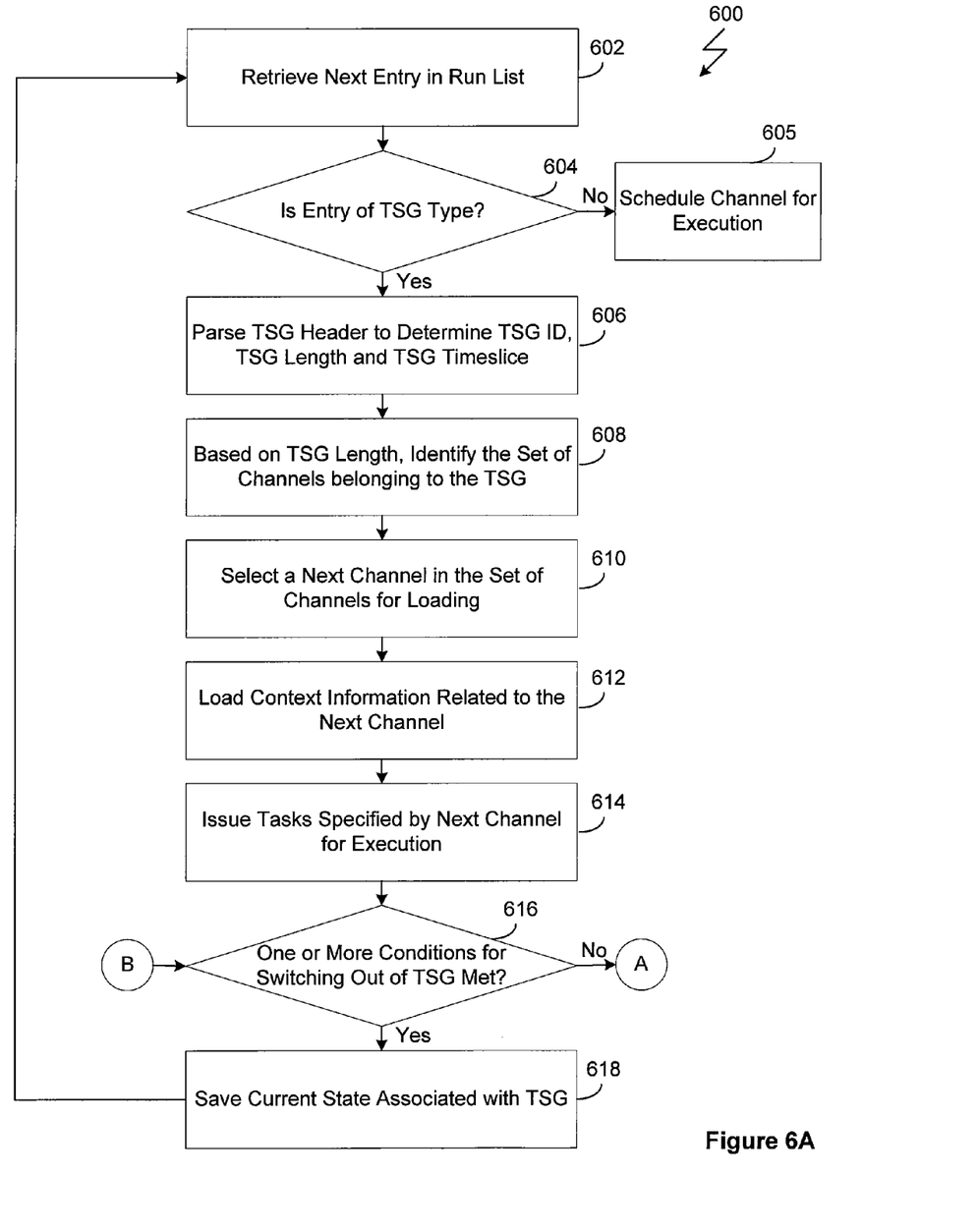
FIGS. 6A and 6B set forth a flow diagram of method steps for identifying a next channel for execution, according to one embodiment of the present invention.
Figure 6B:
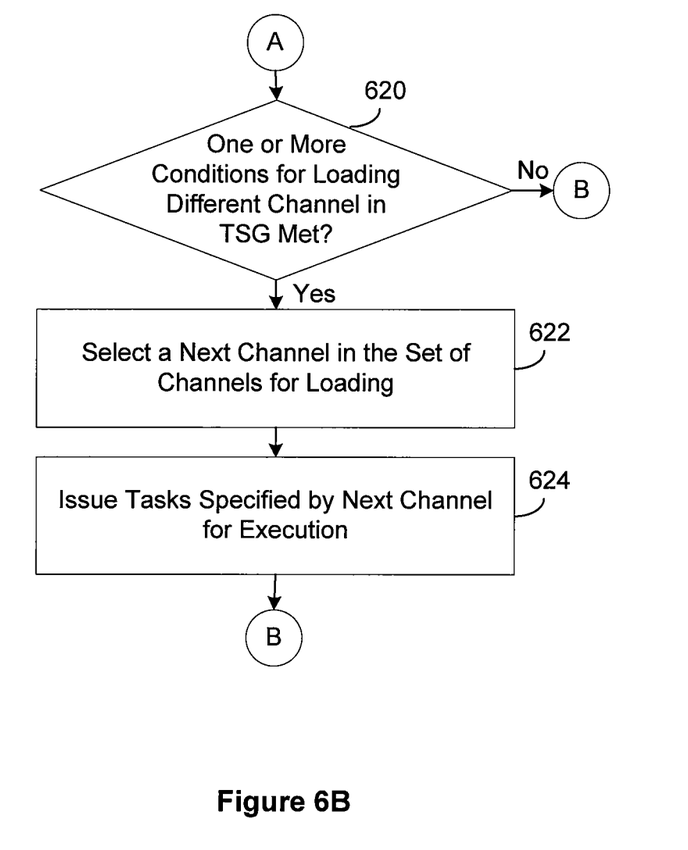

FIGS. 6A and 6B set forth a flow diagram of method steps for identifying a next channel for execution, according to one embodiment of the present invention. Although the method steps are described in conjunction with the systems for FIGS. 1-5, persons skilled in the art will understand that any system configured to perform the method steps, in any order, is within the scope of the invention.

The method 600 begins at step 602, where the run list processor 502, when determining which channel should be scheduled for execution next, retrieves the next entry in the run list 402. At step 604, the run list processor 502 determines whether the retrieved entry is of a TSG type. If the retrieved entry is not of the TSG type, then the method 600 proceeds to step 605, where the run list processor 502 schedules the channel associated with the retrieved entry for execution. If, however, the retrieved entry is of the TSG type, then the method 600 proceeds to step 606.

At step 606, the run list processor 502 parses the TSG header included in the retrieved entry to determine the TSG ID, the TSG length and the TSG time slice of the TSG associated with the retrieved entry. As previously described herein, the TSG length indicates the number of channels belonging to the TSG and the TSG time slice indicates an amount of time that channels belonging to the TSG can be executed in a single processing cycle.

At step 608, the run list processor 502, based on the TSG length, identifies the set of channels belonging to the TSG. Again, the run list 402 is organized such that channel run list entries associated with the channels belonging to the TSG are included directly after the retrieved entry. At step 610, the run list processor 502 selects a channel within the set of channels to be scheduled for execution next. In one embodiment, each channel includes a "next" identifier, which, when set, indicates that the particular channel should be scheduled for execution next. This bit is only used in step 610.

At step 610, the context switcher 504 loads the per-channel context information 406 related to the selected channel. Because the selected channel is the first channel belonging to the TSG to be scheduled in the current processing cycle, the context information needs to be set within the GPCs 208 so that tasks specified by the channel may be executed. The time slice allocated to the TSG begins when the per-channel context information 406 related to the selected channel is loaded. Within this time slice, channels belonging to the TSG can be executed unless interrupted. At step 612, the run list processor 206 issues tasks specified by the selected channel for execution within the GPCs 208.

At step 616, the run list processor 502 determines whether one or more conditions for switching to a channel outside of the TSG are met. As previously discussed herein, the conditions for switching to a channel outside of the TSG include, but are not limited to, (i) the expiration of the time slice allocated to the TSG, (ii) each channel within the TSG being completely executed and, therefore, idle, (iii) each channel within the TSG being stalled because of a semaphore acquire failure or being idle, (iv) a yield method being encountered that effectively expires the time slice allocated to the TSG, and (vi) a pre-emption condition that forces the selection of a new channel or of a different run list.

If a condition that requires a channel switch to a channel outside the TSG is met, then the method 600 proceeds to step 618, where the run list processor 502 saves the current state of the TSG. The method 600 then proceeds back to step 602 where the next entry within the run list is retrieved to select the next channel outside of the TSG to be executed. Because the per-channel context information related to a channel outside of the TSG is different from the currently set context information, a context switch operation is needed when switching to a channel outside of the TSG.

If a condition that requires a channel switch to a channel outside the TSG is not met, then the method 600 proceeds to step 620. At step 620, the run list processor 502 determines whether one or more conditions for switching to a different channel within the TSG are met. Again, a channel switch from the particular channel to a different channel within the TSG is needed when the execution of tasks within the particular channel is completed or when the execution is stalled as a result of a semaphore acquire failure. If a condition that requires a channel switch to a different channel within the TSG is not met, then the method returns back to step 614 previously described herein.

If, however, a condition that requires a channel switch to a different channel within the TSG is met, then the method proceeds to step 622, where the run list processor 502 in one embodiment clears the next bit for the current channel, selects a next channel in the set of channels belonging to the TSG, and sets the next bit in the new channel. At step 624, the run list processor 206 issues tasks specified by the selected channel for execution within the GPCs 208. Importantly, because each channel in the TSG shares the same context information, a context switch operation is not needed when the processing of a particular channel in the TSG stops and the processing of a next channel in the TSG begins. The method 600 then returns back to step 616 previously described herein.

One advantage of the present invention is that different channels of work that share the same context information can be executed by the GPCs 208 without the need of intervening context switching operations. Consequently, if a channel is stalled, a different channel can be scheduled for execution without incurring a context switching cost, thereby increasing the overall throughput, efficiency, and performance of the system.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer implemented method for scheduling tasks for execution within a processing unit, the method comprising:

determining that a set of channels that specify a plurality of tasks to be executed within the processing unit is associated with a time slice group, wherein each channel in the set of channels specifies a different set of tasks in the plurality of tasks, the time slice group is associated with an amount of time that specifies a maximum amount of time that tasks included in the plurality of tasks should execute, and context information corresponding to every channel associated with the time slice group is the same;

selecting a first channel included in the set of channels for execution within the processing unit next;

determining whether context information corresponding to the first channel needs to be set within the processing unit, wherein determining comprises, when a previous channel executed by the processing unit is included in the set of channels, determining that context information corresponding to the first channel does not need to be set within the processing unit, and, when the previous channel executed by the processing unit is not included in the set of channels, determining that context information corresponding to the first channel does need to be set within the processing unit; and scheduling a first set of tasks in the plurality of tasks specified by the first channel for execution within the processing unit.

2. The method of claim 1, wherein determining that the set of channels is associated with the time slice group comprises parsing a time slice group header associated with the time slice group that identifies the set of channels.

3. The method of claim 1, further comprising determining that the processing unit should stop executing tasks specified by channels in the set of channels.

4. The method of claim 3, wherein the amount of time further specifies a duration of time that tasks specified by the set of channels are permitted to execute after being scheduled, and wherein the processing unit should stop executing tasks specified by channels in the set of channels when the amount of time associated with the time slice group expires.

5. The method of claim 3, wherein the processing unit should stop executing tasks specified by channels in the set of channels when each channel in the set of channels is waiting for a task to complete or idle.

6. The method of claim 3, further comprising, when the processing unit should stop executing tasks specified by channels in the set of channels, saving state associated with time slice group and selecting a second channel not associated with the time slice group for execution within the processing unit next.

7. The method of claim 1, further comprising, before selecting the first channel, determining whether a next channel included in the set of channels should be selected for execution within the processing unit.

8. The method of claim 7, wherein a next channel included in the set of channels should be selected for execution when a previous channel that was executing within the processing unit is idle or waiting for a task to complete.

9. The method of claim 1, wherein the set of channels has access to a plurality of processing clusters, wherein each processing cluster is associated with at least one channel.

10. The method of claim 1, wherein determining whether context information corresponding to the first channel needs to be set within the processing unit further comprises determining whether each channel included in the set of channels is stalled because of a semaphore acquire failure.

11. The method of claim 1, wherein determining whether context information corresponding to the first channel needs to be set within the processing unit further comprises determining whether a yield method is encountered that effectively expires the amount of time.

12. The method of claim 1, wherein determining whether context information corresponding to the first channel needs to be set within the processing unit further comprises determining whether a preemption condition forces selection of a new channel.

13. A computer system, comprising:
a processor configured to execute tasks; and
a host interface configured to schedule tasks for execution within the processor, by performing the steps of:
determining that a set of channels that specify a plurality of tasks to be executed within the processor is associated with a time slice group, wherein each channel in the set of channels specifies a different set of tasks in the plurality of tasks, the time slice group is associated with an amount of time that specifies a maximum amount of time that tasks included in the plurality of tasks should execute, and context information corresponding to every channel associated with the time slice group is the same;

selecting a first channel included in the set of channels for execution within the processor next;

determining whether context information corresponding to the first channel needs to be set within the processor unit, wherein determining comprises, when a previous channel executed by the processor is included in the set of channels, determining that context information corresponding to the first channel does not need to be set within the processor, and, when the previous channel executed by the processor is not included in the set of channels, determining that context information corresponding to the first channel does need to be set within the processor; and scheduling a first set of tasks in the plurality of tasks specified by the first channel for execution within the processor.

14. The computer system of claim 13, wherein determining that the set of channels is associated with the time slice group comprises parsing a time slice group header associated with the time slice group that identifies the set of channels.

15. The computer system of claim 13, further comprising determining that the processor should stop executing tasks specified by channels in the set of channels.

16. The computer system of claim 15, wherein the amount of time further specifies a duration of time that tasks specified by the set of channels are permitted to execute after being scheduled.

17. The computer system of claim 16, wherein the processor should stop executing tasks specified by channels in the set of channels when the amount of time expires.

18. The computer system of claim 16, wherein the processor should stop executing tasks specified by channels in the set of channels when each channel in the set of channels is waiting for a task to complete or idle.

19. The computer system of claim 16, further comprising, when the processor should stop executing tasks specified by channels in the set of channels, saving state associated with time slice group and selecting a second channel not associated with the time slice group for execution within the processor next.

20. The computer system of claim 13, further comprising, before selecting the first channel, determining whether a next channel included in the set of channels should be selected for execution within the processor.

21. The computer system of claim 20, wherein a next channel included in the set of channels should be selected for execution when a previous channel that was executing within the processor is idle or waiting for a task to complete.

22. The computer system of claim 13, wherein the set of channels has access to a plurality of processing clusters, wherein each processing cluster is associated with at least one channel.

23. A non-transitory computer readable medium storing instructions that, when executed by a processor, cause the processor to schedule tasks for execution within a processing unit, by performing the steps of:
determining that a set of channels that specify a plurality of tasks to be executed within the processing unit is associated with a time slice group, wherein each channel in the set of channels specifies a different set of tasks in the plurality of tasks, the time slice group is associated with an amount of time that specifies a maximum amount of time that tasks included in the plurality of tasks should execute, and context information corresponding to every channel associated with the time slice group is the same;

selecting a first channel included in the set of channels for execution within the processing unit next;

determining whether context information corresponding to the first channel needs to be set within the processing unit, wherein determining comprises, when a previous channel executed by the processing unit is included in the set of channels, determining that context information corresponding to the first channel does not need to be set within the processing unit, and, when the previous channel executed by the processing unit is not included in the set of channels, determining that context information corresponding to the first channel does need to be set within the processing unit; and scheduling a first set of tasks in the plurality of tasks specified by the first channel for execution within the processing unit.

* * * * *

UNITED STATES PATENT AND TRADEMARK OFFICE
CERTIFICATE OF CORRECTION

PATENT NO.         : 9,442,759 B2
APPLICATION NO.    : 13/316334
DATED              : September 13, 2016
INVENTOR(S)        : Duncan et al.

It is certified that error appears in the above-identified patent and that said Letters Patent is hereby corrected as shown below:

In the Claims

Column 18, Claim 13, Line 8, please delete "unit".

Signed and Sealed this
Seventh Day of February, 2017

Michelle K. Lee
*Director of the United States Patent and Trademark Office*